(12) United States Patent
DeLuca

(10) Patent No.: US 7,619,665 B1
(45) Date of Patent: Nov. 17, 2009

(54) RED EYE FILTER FOR IN-CAMERA DIGITAL IMAGE PROCESSING WITHIN A FACE OF AN ACQUIRED SUBJECT

(75) Inventor: Michael J. DeLuca, Boca Raton, FL (US)

(73) Assignee: FotoNation Ireland Limited, Galway (IE)

(*) Notice: Subject to any disclaimer, the term of this patent is extended or adjusted under 35 U.S.C. 154(b) by 505 days.

(21) Appl. No.: 11/379,346

(22) Filed: Apr. 19, 2006

Related U.S. Application Data

(63) Continuation of application No. 10/170,511, filed on Jun. 12, 2002, now Pat. No. 7,042,505, which is a continuation of application No. 08/947,603, filed on Oct. 9, 1997, now Pat. No. 6,407,777.

(51) Int. Cl.
 H04N 5/217 (2006.01)
 H04N 5/228 (2006.01)
(52) U.S. Cl. .................................. 348/241; 348/222.1
(58) Field of Classification Search .............. 348/227.1, 348/229.1, 370–371; 382/117; 396/158, 396/166
See application file for complete search history.

(56) References Cited

U.S. PATENT DOCUMENTS

| | | | |
|---|---|---|---|
| 4,285,588 A | 8/1981 | Mir | |
| 5,016,107 A | 5/1991 | Sasson et al. | |
| 5,070,355 A | 12/1991 | Inoue et al. | |
| 5,130,789 A | 7/1992 | Dobbs et al. | |
| 5,202,720 A | 4/1993 | Fujino et al. | |
| 5,432,863 A | 7/1995 | Benati et al. | |
| 5,452,048 A | 9/1995 | Edgar | |
| 5,537,516 A | 7/1996 | Sherman et al. | |
| 5,748,764 A | 5/1998 | Benati et al. | |
| 5,751,836 A | 5/1998 | Wildes et al. | |
| 5,761,550 A | 6/1998 | Kancigor | |
| 5,781,650 A | 7/1998 | Lobo et al. | |

(Continued)

FOREIGN PATENT DOCUMENTS

EP  1 293 933 A1  10/1972

(Continued)

OTHER PUBLICATIONS

International Search Report and Written Opinon of the International Searching Authority for PCT application No. PCT/EP2004/008706.

(Continued)

Primary Examiner—Kelly L Jerabek
(74) Attorney, Agent, or Firm—Andrew V. Smith

(57) ABSTRACT

A digital camera has an integral flash and stores and displays a digital image. Under certain conditions, a flash photograph taken with the camera may result in a red-eye phenomenon due to a reflection within an eye of a subject of the photograph. The digital camera has a red-eye filter which analyzes the stored image for the red-eye phenomenon and modifies the stored image to eliminate the red-eye phenomenon by changing the red area to black. The modification of the image is enabled when a photograph is taken under conditions indicative of the red-eye phenomenon. The modification is subject to anti-falsing analysis which further examines the area around the red-eye area for indicia of the eye of the subject.

29 Claims, 5 Drawing Sheets

U.S. PATENT DOCUMENTS

| | | |
|---|---|---|
| 5,805,745 A | 9/1998 | Graf |
| 5,862,217 A | 1/1999 | Steinberg et al. |
| 5,862,218 A | 1/1999 | Steinberg et al. |
| 5,990,973 A | 11/1999 | Sakamoto |
| 5,991,549 A | 11/1999 | Tsuchida |
| 6,006,039 A | 12/1999 | Steinberg et al. |
| 6,009,209 A | 12/1999 | Acker et al. |
| 6,016,354 A | 1/2000 | Lin et al. |
| 6,035,072 A | 3/2000 | Read |
| 6,134,339 A | 10/2000 | Luo |
| 6,151,403 A | 11/2000 | Luo |
| 6,172,706 B1 | 1/2001 | Tatsumi |
| 6,204,858 B1 | 3/2001 | Gupta |
| 6,252,976 B1 | 6/2001 | Schildkraut et al. |
| 6,275,614 B1 | 8/2001 | Krishnamurthy et al. |
| 6,278,491 B1 | 8/2001 | Wang et al. |
| 6,292,574 B1 * | 9/2001 | Schildkraut et al. ......... 382/117 |
| 6,407,777 B1 | 6/2002 | DeLuca |
| 6,429,924 B1 | 8/2002 | Milch |
| 6,433,818 B1 | 8/2002 | Steinberg et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg et al. |
| 6,516,154 B1 | 2/2003 | Parulski et al. |
| 6,728,401 B1 | 4/2004 | Hardeberg |
| 6,792,161 B1 | 9/2004 | Imaizumi |
| 7,042,505 B1 * | 5/2006 | DeLuca ...................... 348/241 |
| 7,352,394 B1 * | 4/2008 | DeLuca et al. .............. 348/241 |
| 2002/0041329 A1 | 4/2002 | Steinberg |
| 2002/0093577 A1 | 7/2002 | Kitawaki et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044177 A1 | 3/2003 | Oberhardt et al. |
| 2003/0044178 A1 | 3/2003 | Oberhardt et al. |
| 2003/0058349 A1 | 3/2003 | Takemoto |
| 2003/0095197 A1 | 5/2003 | Wheeler et al. |
| 2003/0118216 A1 | 6/2003 | Goldberg |
| 2003/0142285 A1 | 7/2003 | Enomoto |
| 2003/0202715 A1 | 10/2003 | Kinjo |
| 2004/0223063 A1 | 11/2004 | DeLuca et al. |
| 2005/0031224 A1 | 2/2005 | Prilutsky et al. |
| 2005/0041121 A1 | 2/2005 | Steinberg et al. |
| 2005/0140801 A1 | 6/2005 | Prilutsky et al. |

FOREIGN PATENT DOCUMENTS

| | | |
|---|---|---|
| EP | 0 884 694 A1 | 12/1998 |
| EP | 0 911 759 A2 | 4/1999 |
| EP | 0 911 759 A3 | 4/1999 |
| EP | 1 199 672 A2 | 11/2002 |
| EP | 1 296 510 A | 3/2003 |
| EP | 1 288 860 A1 | 6/2004 |
| EP | 1 429 290 A | 6/2004 |
| EP | 1 288 858 A1 | 8/2004 |
| EP | 1 478 169 A | 11/2004 |
| EP | 1 288 859 A1 | 3/2005 |
| JP | 4-192681 | 8/1993 |
| JP | 2000 134486 | 11/2001 |
| JP | 2002 271808 | 4/2004 |
| WO | WO 9917254 | 4/1999 |
| WO | WO 0171421 A1 | 9/2001 |
| WO | WO 02/45003 A | 6/2002 |
| WO | WO 03026278 A1 | 3/2003 |
| WO | WO 03/071484 A | 8/2003 |
| WO | WO 2005/015896 | 8/2004 |
| WO | WO 2005/041558 A | 5/2005 |
| WO | WO 2005/109853 A1 | 5/2005 |
| WO | WO 2006/018056 A1 | 2/2006 |

OTHER PUBLICATIONS

International Search Report and Written Opinion of the International Searching Authority for PCT Application No. PCT/EP2005/005033.
International Search Report and Written Opinion of the International Searching Authority for PCT Application No. PCT/EP2005/005907.
Patent Abstracts of Japan, publication No. 2000050062, application No. 10-217124, published Feb. 18, 2000.
U.S. Appl. No. 10/772,767, filed Feb. 4, 2004, inventors Michael J. Deluca, et al.
U.S. Appl. No. 11/217,278, filed Aug. 30, 2005, inventors Eran Steinberg, et al.

* cited by examiner

RED EYE FILTER FOR IN-CAMERA DIGITAL IMAGE PROCESSING WITHIN A FACE OF AN ACQUIRED SUBJECT

PRIORITY

This application is a continuation of U.S. patent application Ser. No. 10/170,511, filed Jun. 12, 2002, now U.S. Pat. No. 7,042,505 which is a continuation application of U.S. application Ser. No. 08/947,603, filed Oct. 9, 1997, now U.S. Pat. No. 6,407,777. Each of these applications is hereby incorporated by reference.

FIELD OF THE INVENTION

The invention relates generally to the area of flash photography, and more specifically to filtering "red-eye" from a digital camera image.

BACKGROUND OF THE INVENTION

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The red-eye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically loosing any spontaneity of the subject captured in the photograph.

Those familiar with the art have developed complex analysis processes operating within a camera prior to invoking a pre-flash. Various conditions are monitored prior to the photograph before the pre-flash is generated, the conditions include the ambient light level and the distance of the subject from the camera. Such a system is described in U.S. Pat. No. 5,070,355 to Inoue et al. Although that invention minimizes the occurrences where a pre-flash is used, it does not eliminate the need for a pre-flash. What is needed is a method of eliminating the red-eye phenomenon with a miniature camera having an integral without the distraction of a pre-flash.

Digital cameras are becoming more popular and smaller in size. Digital cameras have several advantages over film cameras. Digital cameras eliminate the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. Nevertheless, without a pre-flash, both digital and film cameras can capture the red-eye phenomenon as the flash reflects within a subject's eye. Thus, what is needed is a method of eliminating red-eye phenomenon within a miniature digital camera having a flash without the distraction of a pre-flash.

DESCRIPTION OF A PREFERRED EMBODIMENT

Figure 1:
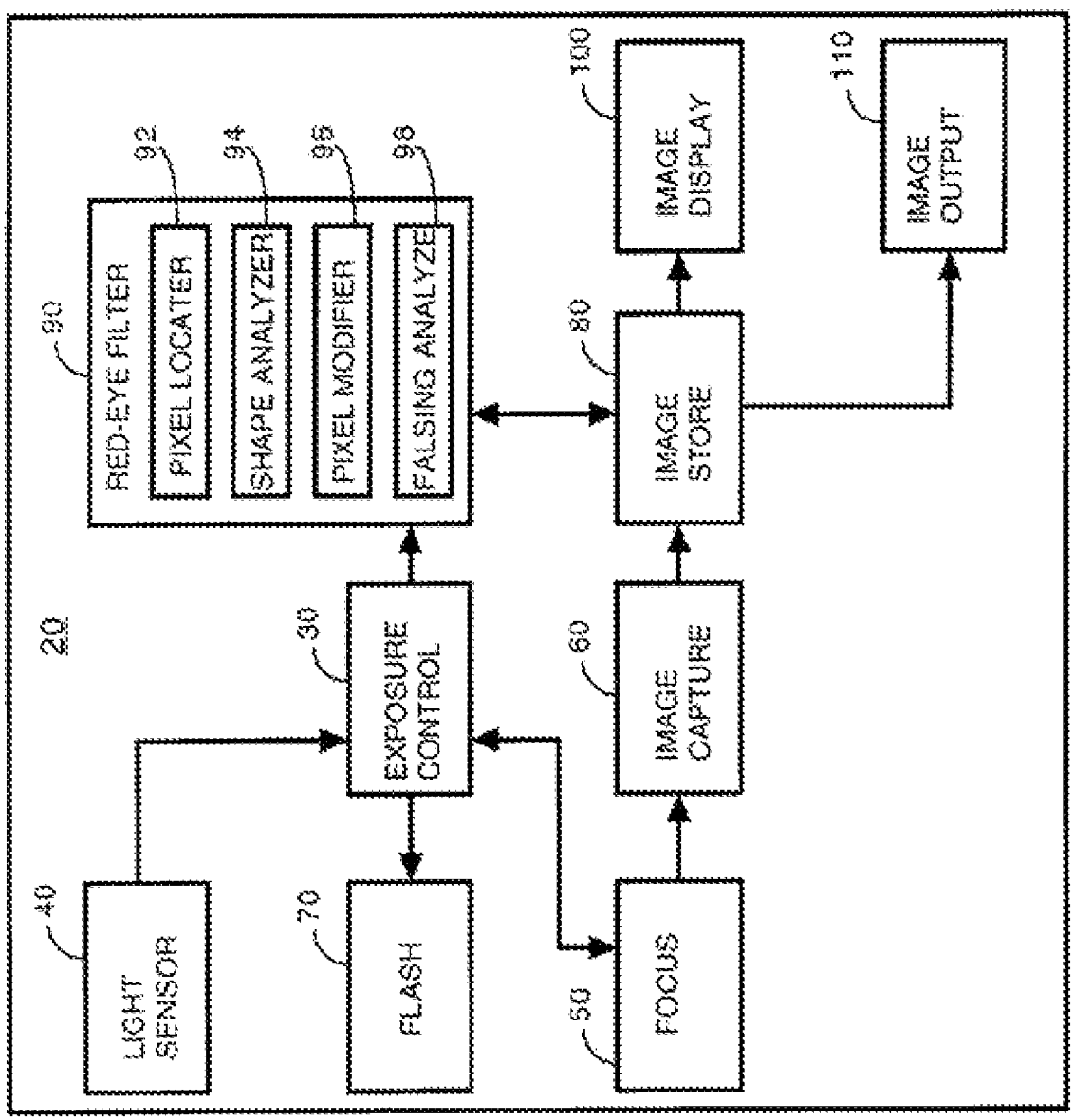
FIG. 1 shows a block diagram of a camera apparatus operating in accordance with the present invention.

FIG. 1 shows a block diagram of a camera apparatus operating in accordance with the present invention. The camera 20 includes an exposure control 30 that, in response to a user input, initiates and controls the digital photographic process. Ambient light is determined using light sensor 40 in order to automatically determine if a flash is to be used. The distance to the subject is determined using focusing means 50 which also focuses the image on image capture means 60. The image capture means digitally records the image in color. The image capture means is known to those familiar with the art and may include a CCD (charge coupled device) to facilitate digital recording. If a flash is to be used, exposure control means 30 causes the flash means 70 to generate a photographic flash in substantial coincidence with the recording of the image by image capture means 60. The flash may be selectively generated either in response to the light sensor 40 or a manual input from the user of the camera. The image recorded by image capture means 60 is stored in image store means 80 which may comprise computer memory such a dynamic random access memory or a nonvolatile memory. The red-eye filter 90 then analyzes the stored image for characteristics of red-eye, and if found, modifies the image and removes the red-eye phenomenon from the photograph as will be describe in more detail. The red-eye filter includes a pixel locator 92 for locating pixels having a color indicative of red-eye; a shape analyzer 94 for determining if a grouping of at least a portion of the pixels located by the pixel locator comprise a shape indicative of red-eye; a pixel modifier 96 for modifying the color of pixels within the grouping; and an falsing analyzer 98 for further processing the image around the grouping for details indicative of an image of an eye. The modified image may be either displayed on image display 100 or downloaded to another display device, such as a personal computer or printer via image output means 110. It can be appreciated that many of the processes implemented in the digital camera may be implemented in or controlled by software operating in a microcomputer (.mu.C) or digital signal processor (DSP) and/or an application specific integrated circuit (ASIC).

Figure 2:
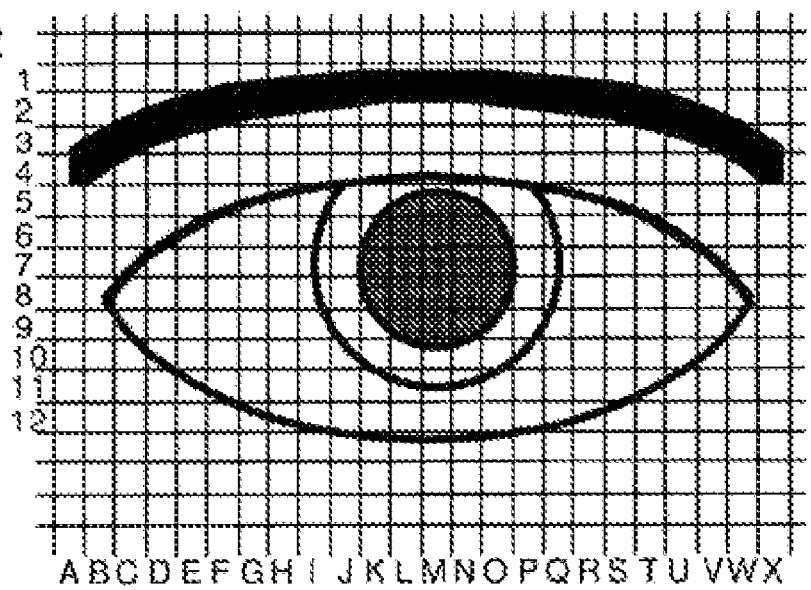
FIG. 2 shows a pixel grid upon which an image of an eye is focused.

FIG. 2 shows a pixel grid upon which an image of an eye is focused. Preferably the digital camera records an image comprising a grid of pixels at least 640 by 480. FIG. 2 shows a 24 by 12 pixel portion of the larger grid labeled columns A-X and rows 1-12 respectively.

Figure 3:
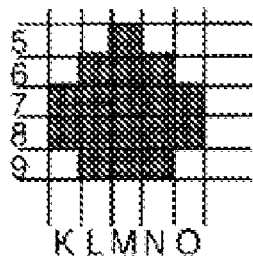
FIG. 3 shows pixel coordinates of the pupil of FIG. 2.

FIG. 3 shows pixel coordinates of the pupil of FIG. 2. The pupil is the darkened circular portion and substantially includes seventeen pixels: K7, K8, L6, L7, L8, L9, M5, M6, M7, M8, M9, N6, N7, N8, N9, O7 and O8, as indicated by shaded squares at the aforementioned coordinates. In a non-flash photograph, these pupil pixels would be substantially black in color. In a red-eye photograph, these pixels would be substantially red in color. It should be noted that the aforementioned pupil pixels have a shape indicative of the pupil of the subject, the shape preferably being a substantially circular, semi-circular or oval grouping of pixels. Locating a group of substantially red pixels forming a substantially circular or oval area is useful by the red-eye filter.

Figure 4:
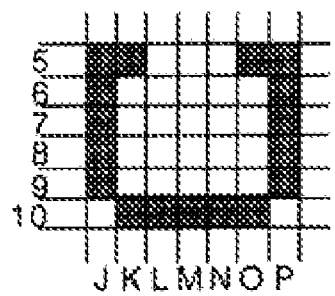
FIG. 4 shows pixel coordinates of the iris of FIG. 2.

FIG. 4 shows pixel coordinates of the iris of FIG. 2. The iris pixels are substantially adjacent to the pupil pixels of FIG. 2. Iris pixels J5, J6, J7, J8, J9, K5, K10, L10, M10, N10, O5, O10, P5, P6, P7, P8 and P9 are indicated by shaded squares at the aforementioned coordinates. The iris pixels substantially surround the pupil pixels and may be used as further indicia of a pupil. In a typical subject, the iris pixels will have a substantially constant color. However, the color will vary as the natural color of the eyes each individual subject varies. The existence of iris pixels depends upon the size of the iris at the time of the photograph, if the pupil is very large then iris pixels may not be present.

Figure 5:
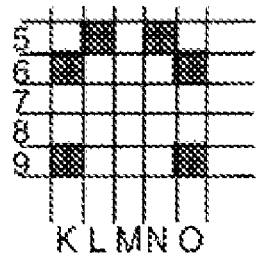
FIG. 5 shows pixel coordinates which contain a combination of iris and pupil colors of FIG. 2.

FIG. 5 shows pixel coordinates which include a combination of iris and pupil colors of FIG. 2. The pupil/iris pixels are located at K6, K9, L5, N5, O6, and O9, as indicated by shaded squares at the aforementioned coordinates. The pupil/iris pixels are adjacent to the pupil pixels, and also adjacent to any iris pixels which may be present. Pupil/iris pixels may also contain colors of other areas of the subject's eyes including skin tones and white areas of the eye.

Figure 6:
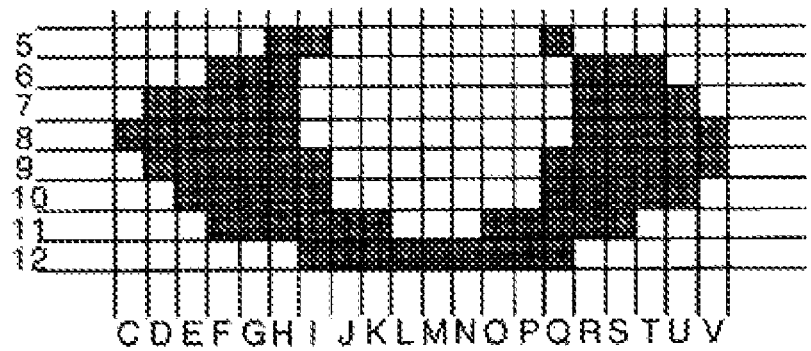
FIG. 6 shows pixel coordinates of the white eye area of FIG. 2.

FIG. 6 shows pixel coordinates of the white eye area of FIG. 2. The seventy one pixels are indicated by the shaded squares of FIG. 6 and are substantially white in color and are in the vicinity of and substantially surround the pupil pixels of FIG. 2.

Figure 7:
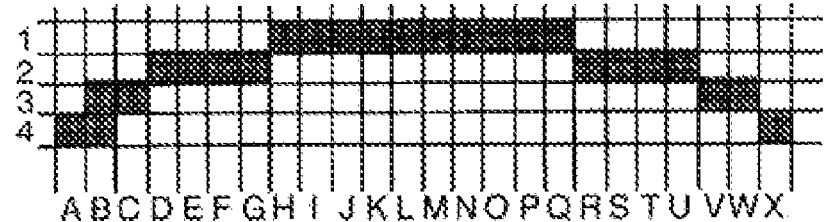
FIG. 7 shows pixel coordinates of the eyebrow area of FIG. 2.

FIG. 7 shows pixel coordinates of the eyebrow area of FIG. 2. The pixels are indicated by the shaded squares of FIG. 7 and are substantially white in color. The eyebrow pixels substantially form a continuous line in the vicinity of the pupil pixels. The color of the line will vary as the natural color of the eyebrow of each individual subject varies. Furthermore, some subjects may have no visible eyebrow at all.

It should be appreciated that the representations of FIG. 2 through FIG. 7 are particular to the example shown. The coordinates of pixels and actual number of pixels comprising the image of an eye will vary depending upon a number of variables. These variables include the location of the subject within the photograph, the distance between the subject and the camera, and the pixel density of the camera.

The red-eye filter 90 of FIG. 1 searches the digitally stored image for pixels having a substantially red color, then determines if the grouping has a round or oval characteristics, similar to the pixels of FIG. 3. If found, the color of the grouping is modified. In the preferred embodiment, the color is modified to black.

Searching for a circular or oval grouping helps eliminate falsely modifying red pixels which are not due to the red-eye phenomenon. In the example of FIG. 2, the red-eye phenomenon is found in a 5.times.5 grouping of pixels of FIG. 3. In other examples, the grouping may contain substantially more or less pixels depending upon the actual number of pixels comprising the image of an eye, but the color and shape of the grouping will be similar. Thus for example, a long line of red pixels will not be falsely modified because the shape is not substantially round or oval.

Additional tests may be used to avoid falsely modifying a round group of pixels having a color indicative of the red-eye phenomenon by further analysis of the pixels in the vicinity of the grouping. For example, in a red-eye phenomenon photograph, there will typically be no other pixels within the vicinity of a radius originating at the grouping having a similar red color because the pupil is surrounded by components of the subject's face, and the red-eye color is not normally found as a natural color on the face of the subject. Preferably the radius is large enough to analyze enough pixels to avoid falsing, yet small enough to exclude the other eye of the subject, which may also have the red-eye phenomenon. Preferably, the radius includes a range between two and five times the radius of the grouping. Other indicia of the recording may be used to validate the existence of red-eye including identification of iris pixels of FIG. 4 which surround the pupil pixels. The iris pixels will have a substantially common color, but the size and color of the iris will vary from subject to subject. Furthermore, the white area of the eye may be identified as a grouping of substantially white pixels in the vicinity of and substantially surrounding the pupil pixels as shown in FIG. 6. However, the location of the pupil within the opening of the eyelids is variable depending upon the orientation of the head of the subject at the time of the photograph. Consequently, identification of a number of substantially white pixels in the vicinity of the iris without a requirement of surrounding the grouping will further validate the identification of the red-eye phenomenon and prevent false modification of other red pixel groupings. The number of substantially white pixels is preferably between two and twenty times the number of pixels in the pupil grouping. As a further validation, the eyebrow pixels of FIG. 7 can be identified.

Further, additional criterion can be used to avoid falsely modifying a grouping of red pixels. The criterion include determining if the photographic conditions were indicative of the red-eye phenomenon. These include conditions known in the art including use of a flash, ambient light levels and distance of the subject. If the conditions indicate the red-eye phenomenon is not present, then red-eye filter 90 is not engaged.

FIG. 5 shows combination pupil/iris pixels which have color components of the red-eye phenomenon combined with color components of the iris or even the white area of the eye. The invention modifies these pixels by separating the color components associated with red-eye, modifying color of the separated color components and then adding back modified color to the pixel. Preferably the modified color is black. The result of modifying the red component with a black component makes for a more natural looking result. For example, if the iris is substantially green, a pupil/iris pixel will have components of red and green. The red-eye filter removes the red component and substitutes a black component, effectively resulting in a dark green pixel.

Figure 8:
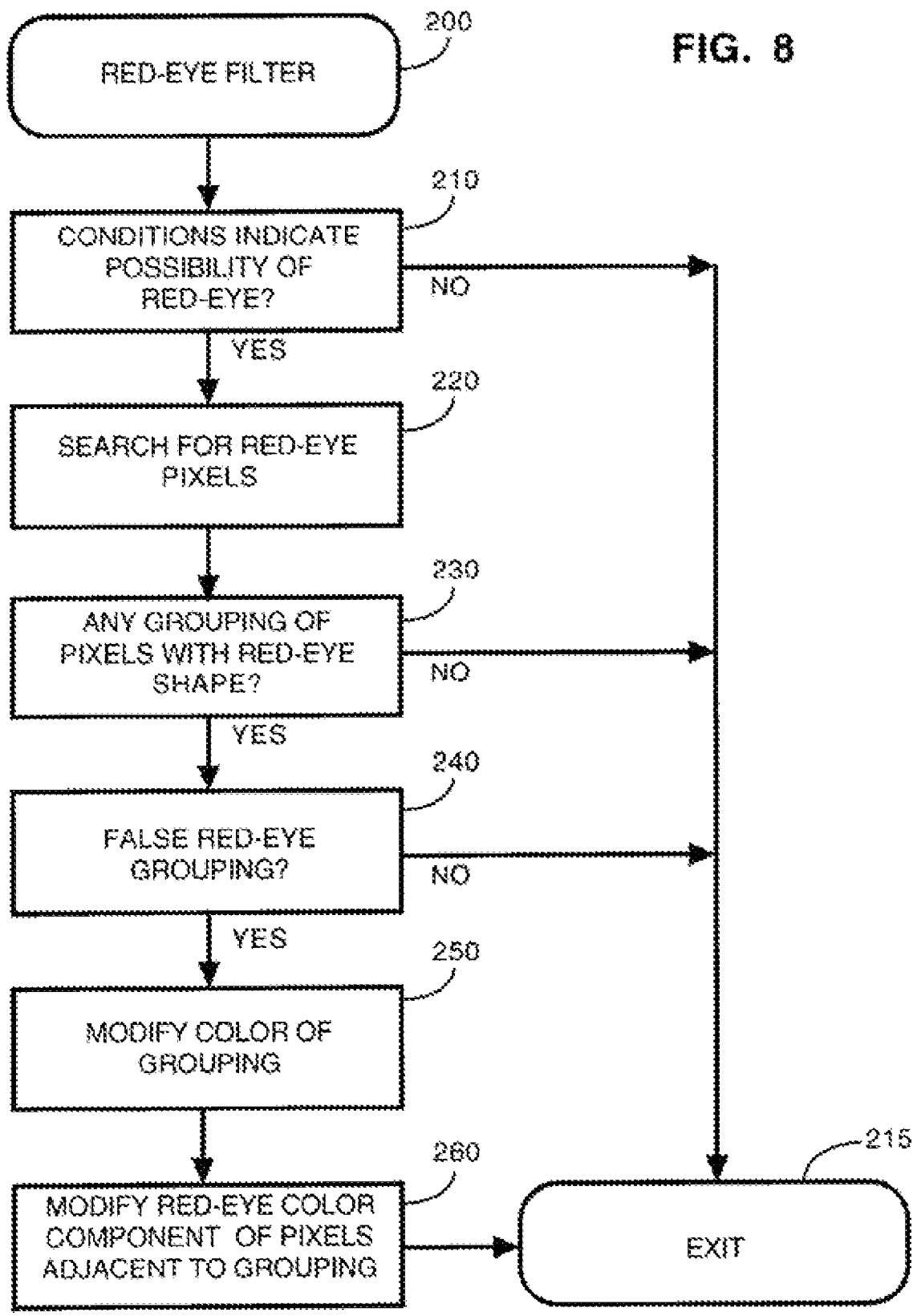
FIG. 8 shows a flow chart of a method operating in accordance with the present invention.

FIG. 8 shows a flow chart of a method operating in accordance with the present invention. The red-eye filter process is in addition to other processes known to those skilled in the art which operate within the camera. These other processes include flash control, focus, and image recording, storage and display. The red-eye filter process preferably operates within software within a .mu.C or DSP and processes an image stored in image store 80. The red-eye filter process is entered at step 200. At step 210 conditions are checked for the possibility of the red-eye phenomenon. These conditions are included in signals from exposure control means 30 which are communicated directly to the red-eye filter. Alternatively the exposure control means may store the signals along with the digital image in image store 80. If conditions do not indicate the possibility of red-eye at step 210, then the process exits at step 215. Step 210 is further detailed in FIG. 9, and is an optional step which may be bypassed in an alternate embodiment. Then is step 220 the digital image is searched of pixels having a color indicative of red-eye. The grouping of the red-eye pixels are then analyzed at step 230. Red-eye is determined if the shape of a grouping is indicative of the red-eye phenomenon. This step also accounts for multiple red-eye groupings in response to a subject having two red-eyes, or multiple subjects having red-eyes. If no groupings indicative of red-eye are found, then the process exits at step 215. Otherwise, false red-eye groupings are checked at optional step 240. Step 240 is further detailed in FIG. 10 and prevents the red-eye filter from falsely modifying red pixel groupings which do not have further indicia of the eye of a subject. After eliminating false groupings, if no grouping remain, the process exits at step 215. Otherwise step 250 modifies the color of the groupings which pass step 240, preferably substituting the color red for the color black within the grouping. Then in optional step 260, the pixels surrounding a red-eye grouping are analyzed for a red component. These are equivalent to the pixels of FIG. 5. The red component is substituted for black by the red-eye filter. The process then exits at step 215.

It should be appreciated that the pixel color modification can be stored directly in the image store by replacing red-eye pixels with pixels modified by the red-eye filter. Alternately the modified pixels can be stored as an overlay in the image store, thereby preserving the recorded image and only modifying the image when displayed in image display 100. Preferably the filtered image is communicated through image output means 110. Alternately the unfiltered image with the overlay may be communicated through image output means 110 to a external device such as a personal computer capable of processing such information.

Figure 9:
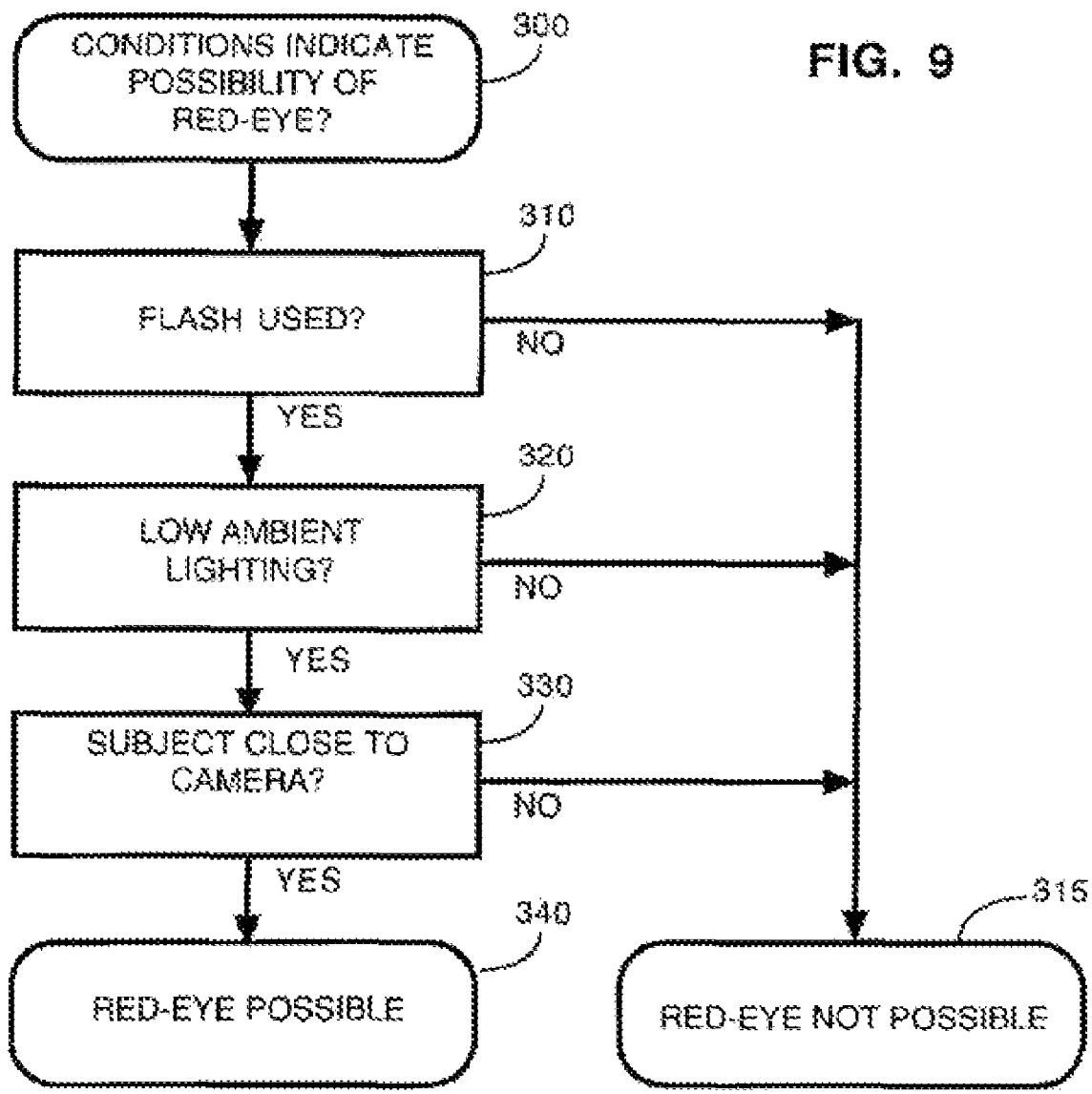
FIG. 9 shows a flow chart for testing if conditions indicate the possibility of a red-eye phenomenon photograph.

FIG. 9 shows a flow chart for testing if conditions indicate the possibility of a red-eye phenomenon corresponding to step 210 of FIG. 8. Entered at step 300, step 310 checks if a flash was used in the photograph. If not, step 315 indicates that red-eye is not possible. Otherwise optional step 320 checks if a low level of ambient light was present at the time of the photograph. If not, step 315 indicates that red-eye is not possible. Otherwise optional step 330 checks if the subject is relatively close to the camera at the time of the photograph. If not, step 215 indicates that red-eye is not possible. Otherwise step 340 indicates that red-eye is possible.

Figure 10:
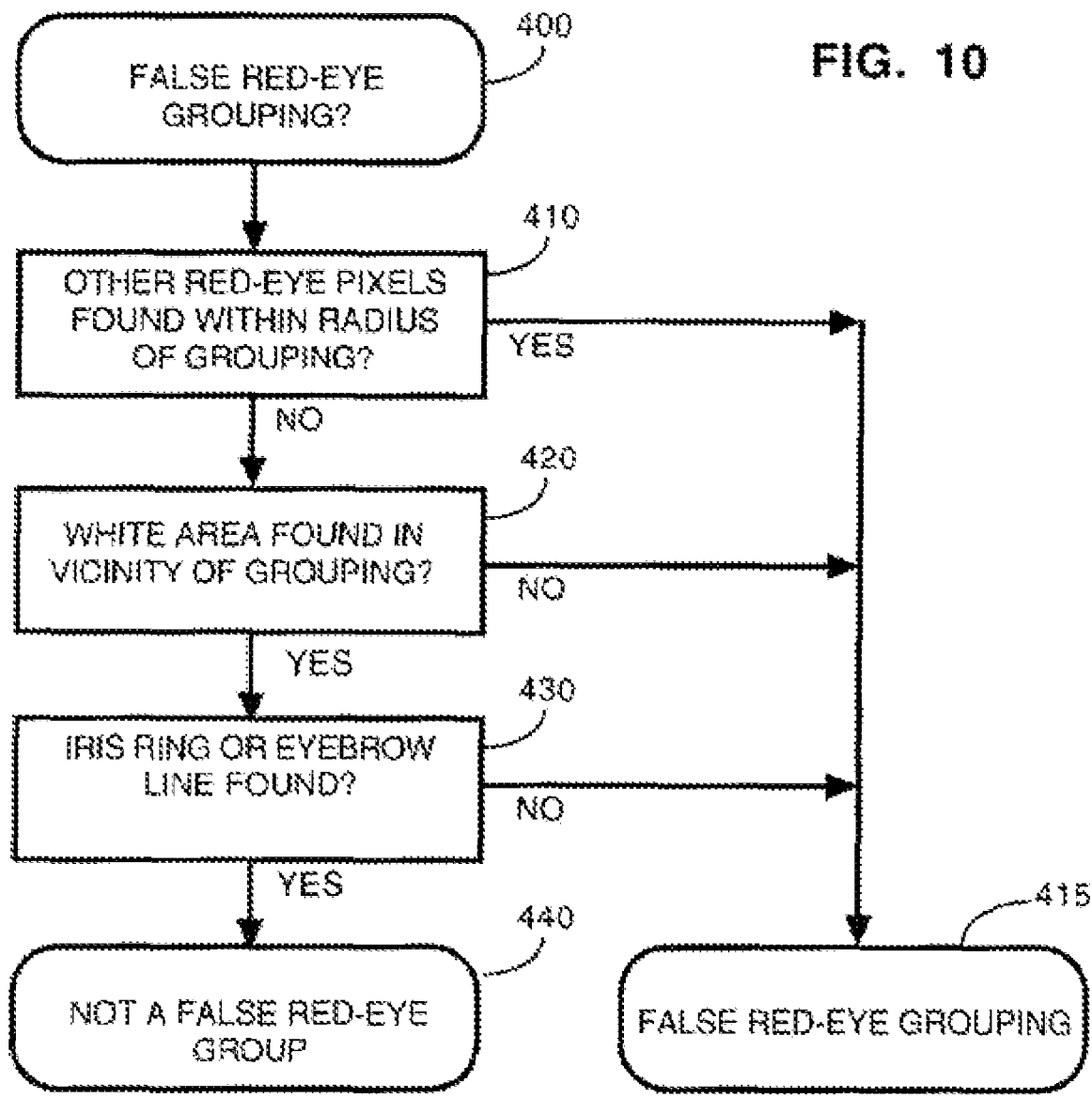
FIG. 10 shows a flow chart for testing if conditions indicate a false red-eye grouping.

FIG. 10 shows a flow chart for testing if conditions indicate a false red-eye grouping corresponding to step 240 of FIG. 8. Entered at step 400, step 410 checks if other red-eye pixels are found within a radius of a grouping. Preferably the radius is between two and five times the radius of the grouping. If found step 415 indicates a false red-eye grouping. Otherwise step 420 checks if a substantially white area of pixels is found in the vicinity of the grouping. This area is indicative of the white area of a subject's eye and has preferably between two and twenty times the number of pixels in the grouping. If not found step 415 indicates a false red-eye grouping. Otherwise step 430 searches the vicinity of the grouping for an iris ring or an eyebrow line. If not found, step 415 indicates a false red-eye grouping. Otherwise step 440 indicates the red-eye grouping is not false. It should be appreciated that each of the tests 410, 420 and 430 check for a false red-eye grouping. In alternate embodiments, other tests may be used to prevent false modification of the image, or the tests of FIG. 10 may be used either alone or in combination.

It should be further appreciated that either the red-eye condition test 210 or the red-eye falsing test 240 of FIG. 8 may be used to achieve satisfactory results. In an alternate embodiment test 240 may be acceptable enough to eliminate test 210, or visa versa. Alternately the selectivity of either the color and/or grouping analysis of the red-eye phenomenon may be sufficient to eliminate both tests 210 and 240 of FIG. 8. Furthermore, the color red as used herein means the range of colors and hues and brightnesses indicative of the red-eye phenomenon, and the color white as used herein means the range of colors and hues and brightnesses indicative of the white area of the human eye.

Thus, what has been provided is a method and apparatus for eliminating red-eye phenomenon within a miniature digital camera having a flash without the distraction of a pre-flash.

I claim:

1. A method in conjunction with acquiring from an image store a digital image including at least one eye of a subject's face, comprising:
   (a) locating a grouping of pixels within a digital image having color indicative of a red eye phenomenon;
   (b) determining that the grouping of pixels has a feature indicative of a pupil of the subject's eye adjacent at least one other feature of the subject's eye or other component of the subject's face; and
   (c) determining that a flash was used in originally capturing the image, for digitally-processing the digital image.

2. The method of claim 1, further comprising modifying the color of the grouping from substantially red in color to substantially black in color.

3. The method of claim 1, wherein the color is substantially red, and the method comprises determining that no other pixels within a vicinity of a radius originating at the grouping has a similar red color.

4. The method of claim 1, comprising determining that pixels within a vicinity of a radius originating at the grouping has a natural color for the subject's face.

5. One or more computer-readable media having digital code embedded therein for programming one or more processors to perform a method in conjunction with acquiring from an image store a digital image including at least one eye of a subject's face, the method comprising:
   (a) locating a grouping of pixels within a digital image having color indicative of a red eye phenomenon;
   (b) determining that the grouping of pixels has a feature indicative of a pupil of a subject's eye adjacent at least one other feature of the subject's eye or other component of the subject's face; and
   (c) determining that a flash was used in originally capturing the image, for digitally-processing the digital image.

6. The one or more computer-readable media of claim 5, the method further comprising determining that the subject was relatively close to the camera at the time of originally capturing the image.

7. The one or more computer-readable media of claim 5, the method further comprising determining that a low level of ambient light was present at the time of originally capturing the image.

8. The one or more computer-readable media of claim 5, the method further comprising modifying the color of the grouping from substantially red in color to substantially black in color.

9. The one or more computer-readable media of claim 5, wherein the color is substantially red, and the method comprises determining that no other pixels within a vicinity of a radius originating at the grouping has a similar red color.

10. The one or more computer-readable media of claim 5, the method comprising determining that pixels within a vicinity of a radius originating at the grouping has a natural color for the subject's face.

11. One or more computer-readable media having digital code embedded therein for programming one or more processors to perform a method in conjunction with acquiring from an image store a digital image including at least one eye of a subject's face, the method comprising:
  (a) locating a grouping of pixels within a digital image having a feature indicative of a pupil of a subject's eye adjacent at least one other feature of the subject's eye or other component of the subject's face,
  (b) determining that the grouping of pixels has a color not indicative of a red eye phenomenon;
  (c) determining that a flash was not used in originally capturing the image, that the subject was not relatively close to the camera at the time of originally capturing the image, or that a high level of ambient light was present at the time of originally capturing the image, or combinations thereof, for digitally-processing the digital image.

12. The one or more computer-readable media of claim 11, the method further comprising inhibiting a step of modifying the color of the grouping of pixels.

13. One or more computer-readable media having digital code embedded therein for programming one or more processors to perform a method in conjunction with acquiring from an image store a digital image including at least one eye of a subject's face, comprising:
  (a) locating a grouping of pixels within a digital image having color indicative of a red eye phenomenon;
  (b) determining that the grouping of pixels has a feature indicative of a pupil of the subject's eye surrounded by one or more other components of the subject's face; and
  (c) determining that a flash was used in originally capturing the image, for digitally-processing the digital image.

14. The one or more computer-readable media of claim 13, further comprising modifying the color of the grouping from substantially red in color to substantially black in color.

15. The one or more computer-readable media of claim 13, wherein the color is substantially red, and the method comprises determining that no other pixels within a vicinity of a radius originating at the grouping has a similar red color.

16. The one or more computer-readable media of claim 13, comprising determining that pixels within a vicinity of a radius originating at the grouping has a natural color for the subject's face.

17. An apparatus that determines the use of a source of light for providing illumination during an image acquisition, comprising:
  (a) a source of light for providing illumination during image acquisition;
  (b) a digital image detector for acquiring an image; and
  (c) a red-eye filter for detecting pixels within the image indicative of a red-eye phenomenon, for digitally-processing the image.

18. The apparatus of claim 17, wherein the red eye filter further for modifying the pixels, and wherein the apparatus further comprises an integral image display for displaying the modified image.

19. The apparatus of claim 17, wherein the pixels have a color and shape indicative of the red-eye phenomenon and the image is modified to change the color to a black color and further wherein:
  (i) said source of light selectively provides illumination during image recording; and
  (ii) said red-eye filter is enabled to modify the image in response to said source of light providing illumination during image acquisition.

20. The apparatus of claim 19, further comprising an exposure control mechanism for determining if the image was acquired in a condition conducive to the red-eye phenomenon and for generating a red-eye signal in response thereto, wherein said red-eye filter is further enabled in response to the red-eye signal.

21. The apparatus of claim 19, wherein said red-eye filter further includes a falsing avoidance apparatus which enables modification of the pixels in response to an absence of color indicative of the red-eye phenomenon within a vicinity of and exclusive to the pixels.

22. The apparatus of claim 19, wherein said red-eye filter further includes a falsing avoidance apparatus which enables modification of the pixels in response a substantially white colored region within a vicinity of the pixels.

23. A digital image acquisition system, comprising an apparatus for capturing digital images and a digital processing component for locating a grouping of pixels within a digital image having color indicative of a red eye phenomenon; for determining that the grouping of pixels has a feature indicative of a pupil of a subject's eye adjacent at least one other feature of the subject's eye or other component of the subject's face; and for determining that a flash was used in originally capturing the image, for digitally-processing the digital image.

24. The system of claim 23, the method further comprising modifying the color of the grouping from substantially red in color to substantially black in color.

25. The system of claim 23, wherein the color is substantially red, and the method comprises determining that no other pixels within a vicinity of a radius originating at the grouping has a similar red color.

26. A digital image acquisition system, comprising an apparatus for capturing digital images and a digital processing component for locating a grouping of pixels within a digital image having color indicative of a red eye phenomenon; for determining that the grouping of pixels has a feature indicative of a pupil of a subject's eye surrounded by one or more other components of the subject's face; and for determining that a flash was used in originally capturing the image, for digitally-processing the digital image.

27. The system of claim 26, the method further comprising modifying the color of the grouping from substantially red in color to substantially black in color.

28. The system of claim 26, wherein the color is substantially red, and the method comprises determining that no other pixels within a vicinity of a radius originating at the grouping has a similar red color.

29. The system of claim 26, the method comprising determining that pixels within a vicinity of a radius originating at the grouping has a natural color for the subject's face.

* * * * *

UNITED STATES PATENT AND TRADEMARK OFFICE
CERTIFICATE OF CORRECTION

PATENT NO.      : 7,619,665 B1                                          Page 1 of 1
APPLICATION NO. : 11/379346
DATED           : November 17, 2009
INVENTOR(S)     : Michael J. DeLuca It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Twenty-sixth Day of October, 2010

David J. Kappos
*Director of the United States Patent and Trademark Office*